(12) United States Patent
De Vos et al.

(10) Patent No.: US 9,924,725 B2
(45) Date of Patent: Mar. 27, 2018

(54) METHOD AND DEVICE FOR PROCESSING A CARCASS PART OF SLAUGHTERED POULTRY IN A PROCESSING LINE

(71) Applicant: Meyn Food Processing Technology B.V., Oostzaan (NL)

(72) Inventors: Ferdinand Allard De Vos, Oostzaan (NL); Pieter Willem Vonk, Oostzaan (NL)

(73) Assignee: MEYN FOOD PROCESSING TECHNOLOGY B.V., Oostzaan (NL)

( * ) Notice: Subject to any disclaimer, the term of this patent is extended or adjusted under 35 U.S.C. 154(b) by 0 days.

(21) Appl. No.: 15/651,330

(22) Filed: Jul. 17, 2017

(65) Prior Publication Data
US 2018/0020684 A1 Jan. 25, 2018

(30) Foreign Application Priority Data
Jul. 25, 2016 (NL) ...................................... 2017236

(51) Int. Cl.
*A22C 21/00* (2006.01)
(52) U.S. Cl.
CPC ........ *A22C 21/0069* (2013.01); *A22C 21/003* (2013.01)
(58) Field of Classification Search
CPC ... A22C 21/00; A22C 21/0023; A22C 21/003; A22C 21/0069; A22C 21/0076; A22C 21/0084
USPC ................. 452/135, 136, 149–153, 155, 156
See application file for complete search history.

(56) References Cited

U.S. PATENT DOCUMENTS

| | | | | |
|---|---|---|---|---|
| 4,951,354 A | | 8/1990 | Callsen | |
| 4,993,114 A | * | 2/1991 | Meyer .................. | A22C 21/003 452/136 |
| 5,098,337 A | * | 3/1992 | Landt ................... | A22C 21/003 452/135 |
| 5,372,539 A | | 12/1994 | Kunig | |
| 5,545,083 A | * | 8/1996 | Bargele .............. | A22C 21/0069 452/136 |
| 5,827,116 A | * | 10/1998 | Al ........................ | A22C 21/003 452/136 |
| 6,935,942 B1 | | 8/2005 | Evers | |
| 7,357,707 B2 | * | 4/2008 | de Vos ................ | A22C 21/003 452/136 |

(Continued)

FOREIGN PATENT DOCUMENTS

| | | |
|---|---|---|
| EP | 0800768 A1 | 10/1997 |
| EP | 2289340 A2 | 3/2011 |

(Continued)

OTHER PUBLICATIONS

PCT Search Report for application No. NL 2017236 dated Mar. 10, 2017.

*Primary Examiner* — Richard T Price, Jr.
(74) *Attorney, Agent, or Firm* — Dority & Manning, P.A.

(57) ABSTRACT

Method and device for processing a carcass part of slaughtered poultry in a processing line. A carcass part may be supported on a carrier that is movable in the processing line and includes wing joints, coracoids, a wishbone being embodied with two legs that merge into each other at an acute angle, a keel bone, and naturally present meat including inner and outer fillets, and means are applied for cutting and/or removing of the wishbone from the carcass part.

12 Claims, 12 Drawing Sheets

(56) References Cited

U.S. PATENT DOCUMENTS

| | | | |
|---|---|---|---|
| 8,308,535 B2* | 11/2012 | De Vos | A22C 21/0069 452/136 |
| 8,801,508 B2* | 8/2014 | Landt | A22C 21/0069 452/135 |
| 2015/0105008 A1 | 4/2015 | Landt | |

FOREIGN PATENT DOCUMENTS

| | | | |
|---|---|---|---|
| EP | 2449886 A2 | 5/2012 |
| EP | 2606737 A2 | 6/2013 |

* cited by examiner

METHOD AND DEVICE FOR PROCESSING A CARCASS PART OF SLAUGHTERED POULTRY IN A PROCESSING LINE

PRIORITY STATEMENT

The present application claims priority under 35 U.S.C. § 119 to Dutch Application No. 2017236, filed Jul. 25, 2016.

FIELD OF THE INVENTION

The subject matter of the present disclosure relates generally to a device and method for processing a carcass part of slaughtered poultry in a processing line.

BACKGROUND OF THE INVENTION

A conventional device and method for processing a carcass part of slaughtered poultry in a processing line are known from e.g., EP-B-2 606 737; EP-B-2 289 340 and EP 2 449 886. U.S. Pat. No. 4,951,354; U.S. Pat. No. 5,372,539 and in particular EP 0 800 768 represent examples of other types of devices and methods in which cutting and/or removing of the wishbone from the carcass part is avoided. The general idea of not cutting or removing the wishbone is to avoid bone splinters. Embodiments of the present invention, however, relate to cutting and/or removing of the wishbone as opposed to the teachings of U.S. Pat. No. 4,951,354; U.S. Pat. No. 5,372,539 and EP 0 800 768.

In conventional devices and methods, cutting and/or removing of the wishbone from the carcass part inevitably involves cutting and/or removing of (minute) fractions of the naturally present meat on the carcass part. It is a standing challenge for the skilled person operational in this field to reduce the fractions of naturally present meat that are taken from the carcass part during removal of the wishbone. These challenges and problems occur irrespective of the manner in which the cutting and/or removing of the wishbone is executed.

SUMMARY OF THE INVENTION

In one exemplary aspect, an exemplary object of the invention is to harvest the outer fillets from the carcass part as complete and undamaged as possible. Another exemplary aspect the invention is to reduce these unintentionally removed fractions of meat from the carcass part during removal of the wishbone and to improve the yield of meat during harvesting of the meat from the carcass part. Still another exemplary aspect of the invention is to reduce the damage to the meat that re-mains on the carcass part and thus achieve also a higher market value of this meat.

To promote these and other objectives of the invention, an exemplary device and method are proposed in accordance with the features of one or more of the appended claims.

Additional aspects and advantages of the invention will be set forth in part in the following description, or may be obvious from the description, or may be learned through practice of the invention.

For one exemplary embodiment of the present invention, a carcass part may be supported on a carrier that is movable in the processing line and includes wing joints, coracoids, a wishbone being embodied with two legs that merge into each other at an acute angle, a keel bone, and naturally present meat including inner and outer fillets, and means are applied for cutting and/or removing of the wishbone from the carcass part.

Exemplary embodiment of the device of the invention may include means to execute the step of moving the outer fillets away from the wishbone. The means for moving the outer fillets away from the wishbone may be arranged to be operational prior to the time that the means for cutting and/or removing of the wishbone act on the carcass part. In conventional devices particularly the outer fillets suffer damage when removing the wishbone, and it may come as a surprise that this—with the benefit of hindsight—measure to first move the outer fillets away from the wishbone provides a solution for a number of problems of the prior art.

According to certain exemplary aspects of the invention, moving the fillets away from the wishbone is to be done prior to cutting and/or removing of the wishbone from the carcass part, since then the integrity of these outer fillets is secured during removal of the wishbone. Consequently, the outer fillets remain undamaged and are capable to achieve a higher market value. Further, when the wish-bone is removed, the yield of the meat that remains on the carcass part is improved since less meat is removed in the process of removing the wishbone, which contributes to higher proceeds.

Preferably, for certain exemplary embodiments, the device may include a cutter to partly release the connections of the outer fillets with the carcass part prior to the means for moving the outer fillets away from the wishbone are operational. This aspect alleviates the scraping operation on the outer fillets and reduces the risk of damage on the outer fillets.

Suitably the means for moving the outer fillets away from the wishbone can be arranged to push a part of the outer fillets adjacent to the wishbone towards another region of the carcass part without the meat of the outer fillets entirely losing their connection with the remainder of the carcass part. Maintaining the connection of the outer fillets with the carcass part is important for their quality and outer appearance when the fillets are later completely taken loose and harvested from the carcass part.

Preferably, for certain exemplary embodiments, the means for moving the outer fillets away from the wishbone can include a scraper. Using a scraper provides a simple and cost-effective tool for effectively moving the outer fillets away from the wishbone.

It is further beneficial that the exemplary method can include the step of fixating the wing joints. Preferably, for certain exemplary aspects, the step of fixating the wing joints is executed prior to and during the step of moving the outer fillets away from the wishbone. This improves the accuracy and reliability of the step of moving the outer fillets away from the wishbone, and the optional following step of removing the wishbone. Accordingly, in certain exemplary aspects, it is preferred that the device of the invention includes a fixation tool for the wing joints, and more preferably that the fixation tool operates during use on the wing joints prior to and during a timeframe that the means for moving the outer fillets away from the wishbone are operational.

The invention will hereinafter be further elucidated with reference to the drawing which schematically shows parts of a device operating to execute a method according to the invention that is not limiting as to the appended claims. Other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features unless noted otherwise.

DETAILED DESCRIPTION OF THE INVENTION

Figure 1:
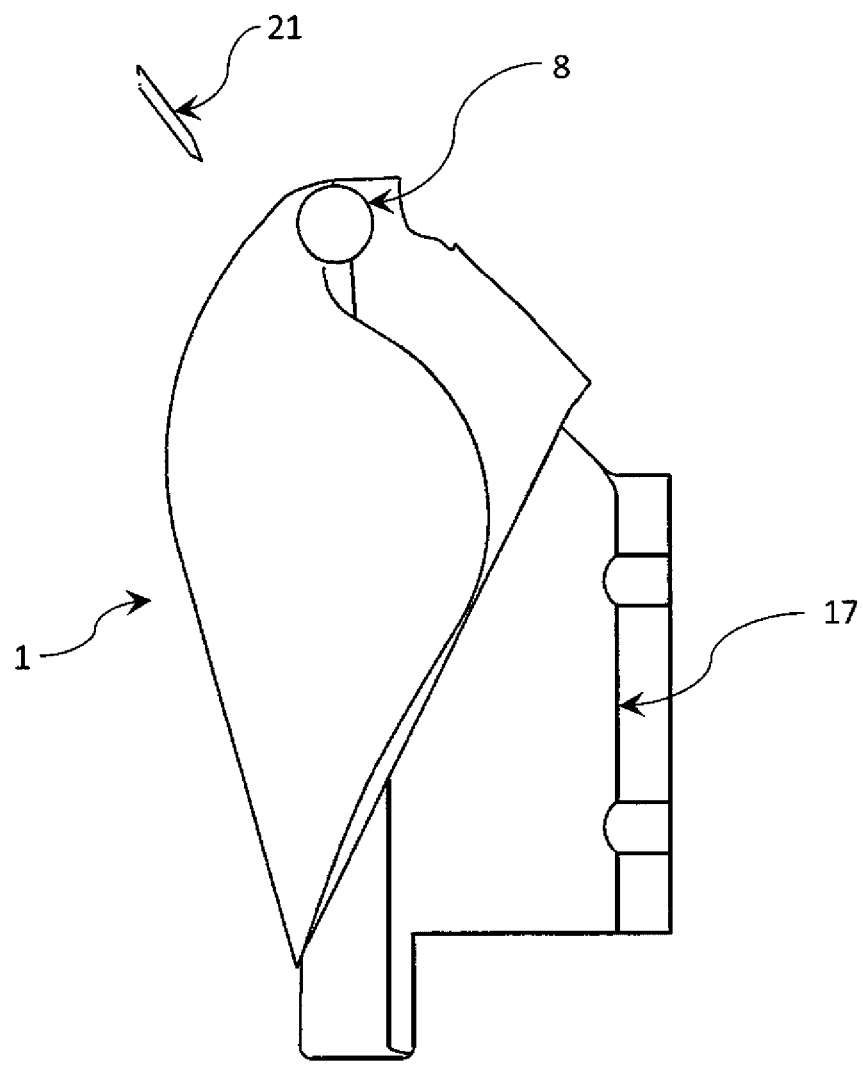
FIGS. 1, 2, 3, 4, 5, and 6 show a series of exemplary, sequential processing steps performed with the device of the invention.

For purposes of describing the invention, reference now will be made in detail to exemplary embodiments and/or exemplary methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

As will be further described with reference to the figures, in one exemplary aspect of the present invention, a carcass part 1 is supported on a carrier 17 that is movable in the processing line and includes a wing joints, coracoids, a wishbone being embodied with two legs that merge into each other at an acute angle, a keel bone, and naturally present meat including inner and outer fillets 20, and means 12, 15, 16 for cutting and/or removing of the wishbone 9 from the carcass part 1, wherein means 18 are applied for moving the outer fillets 20 away from the wishbone 9, which means 18 are arranged to be operational prior to the means 12, 15, 16 for cutting and/or removing of the wishbone 9 from the carcass part 1.

Figure 7:
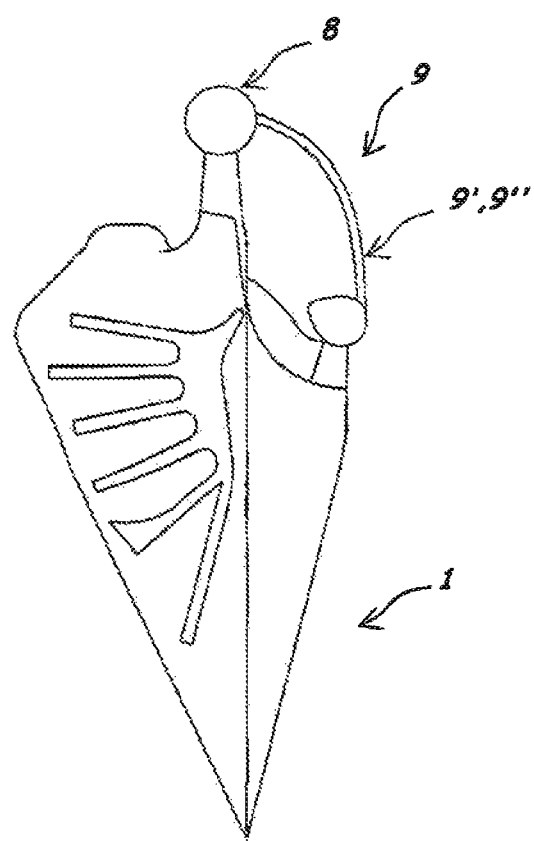
FIG. 7 shows for reference purposes a side view of a carcass part to be processed in accordance with exemplary aspects of the invention.

FIG. 7 illustrates a carcass part 1 in a side view, wherein the wing joints 8, and the wishbone 9 with the wishbone legs 9', 9" are separately indicated.

In FIG. 1, the carcass part 1 is shown mounted on a carrier 17 that in a known way is movable in a processing line. Such an arrangement is known for decades from daily practice in the poultry industry, so that the showing thereof in the drawing can be dispensed with. Any person of ordinary skill in the art is knowledgeable with the arrangement of carriers that move in a processing line for the purpose of processing carcass-parts that are supported by such carriers through the processing line, whilst the carcass-parts are being processed by devices arranged in or next to the processing line.

FIG. 1 further schematically shows a cutting tool 21 that is optionally used to make a prior cut in the connections of the outer fillets with the carcass part 1 before the remainder of the device of the invention becomes operational. The prior cut by the cutting tool 21 is merely intended to make a small incision in the connections to alleviate the subsequent scraping away of the outer fillets from the wishbone as is explained hereinafter.

Figure 2:
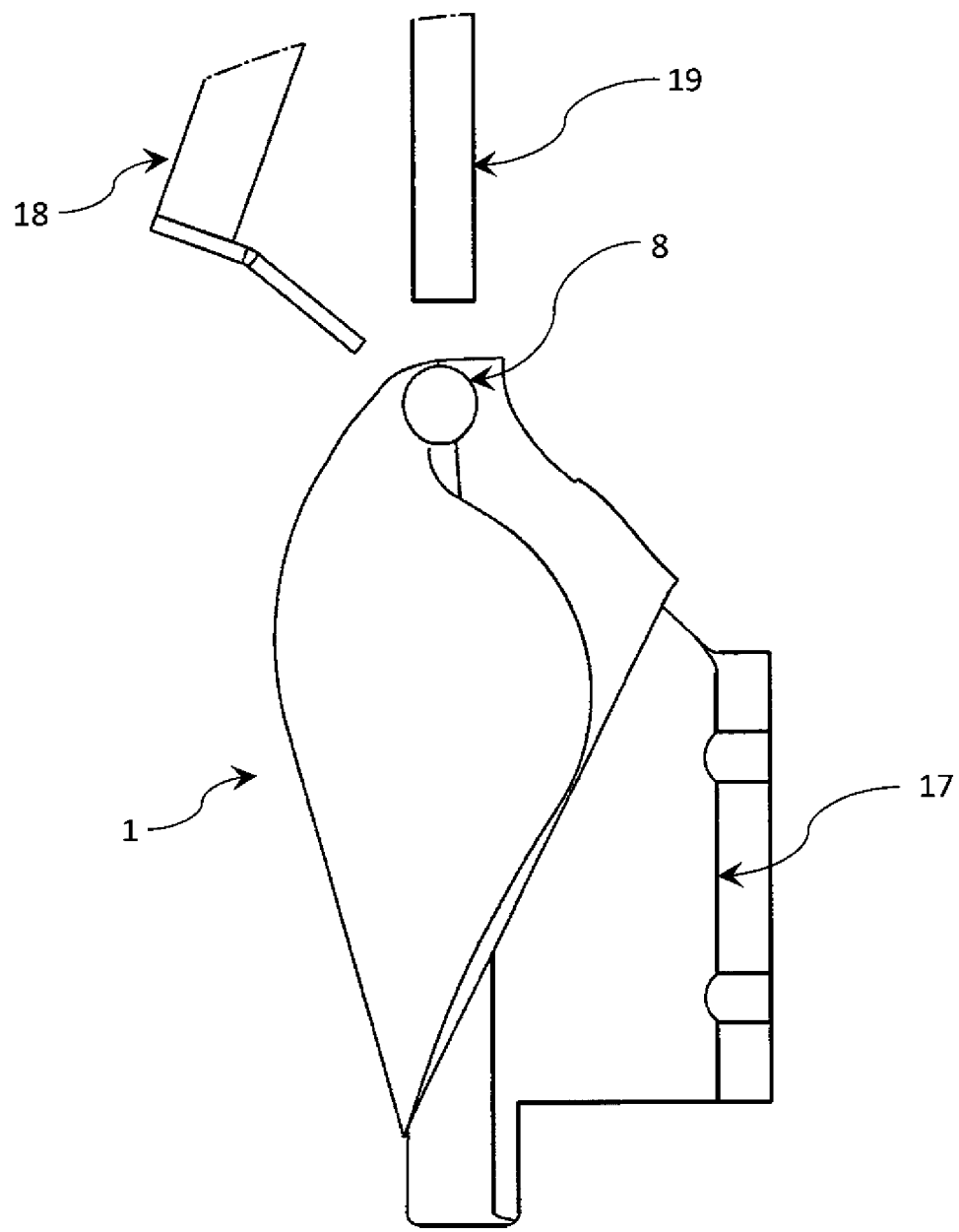

FIG. 2 shows in addition to FIG. 1 and above the carcass part 1 the presence of an exemplary fixation tool 19 and a scraping tool 18, the operation of which tools will become apparent from the following discussion of FIGS. 3-6.

Figure 3:
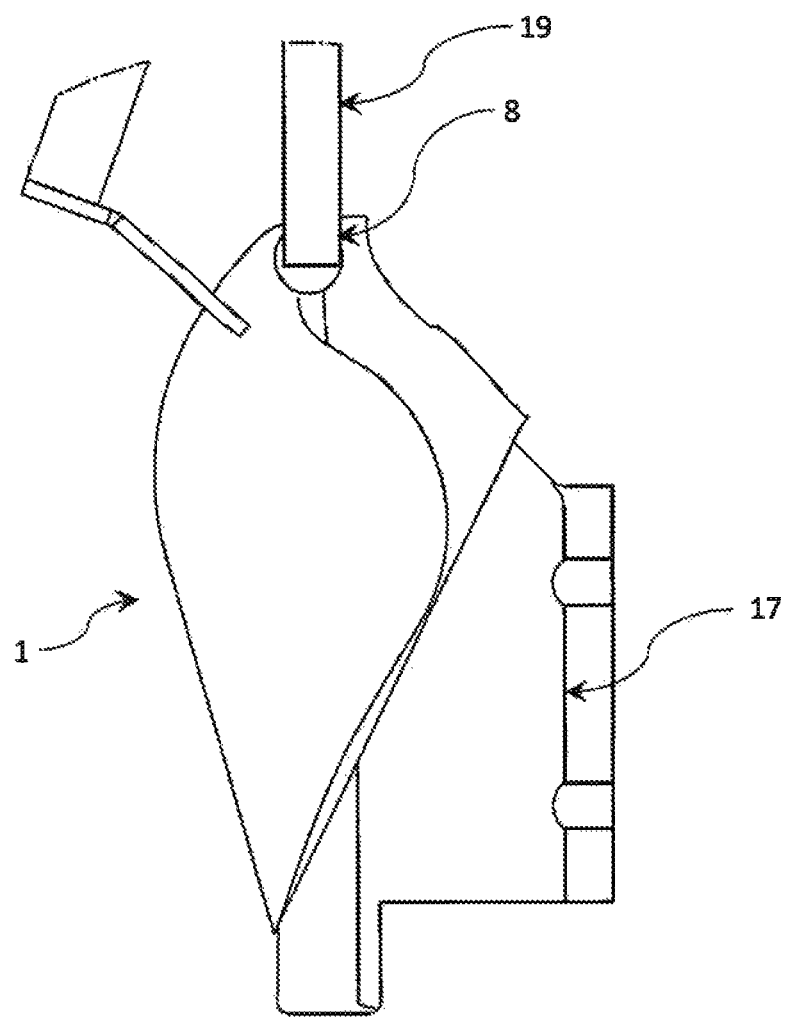

FIG. 3 shows that the fixation tool 19 is first moved towards the carcass part 1 for fixating the wing joints 8 in position prior to the scraping tool 18 becoming operational.

Figure 4:
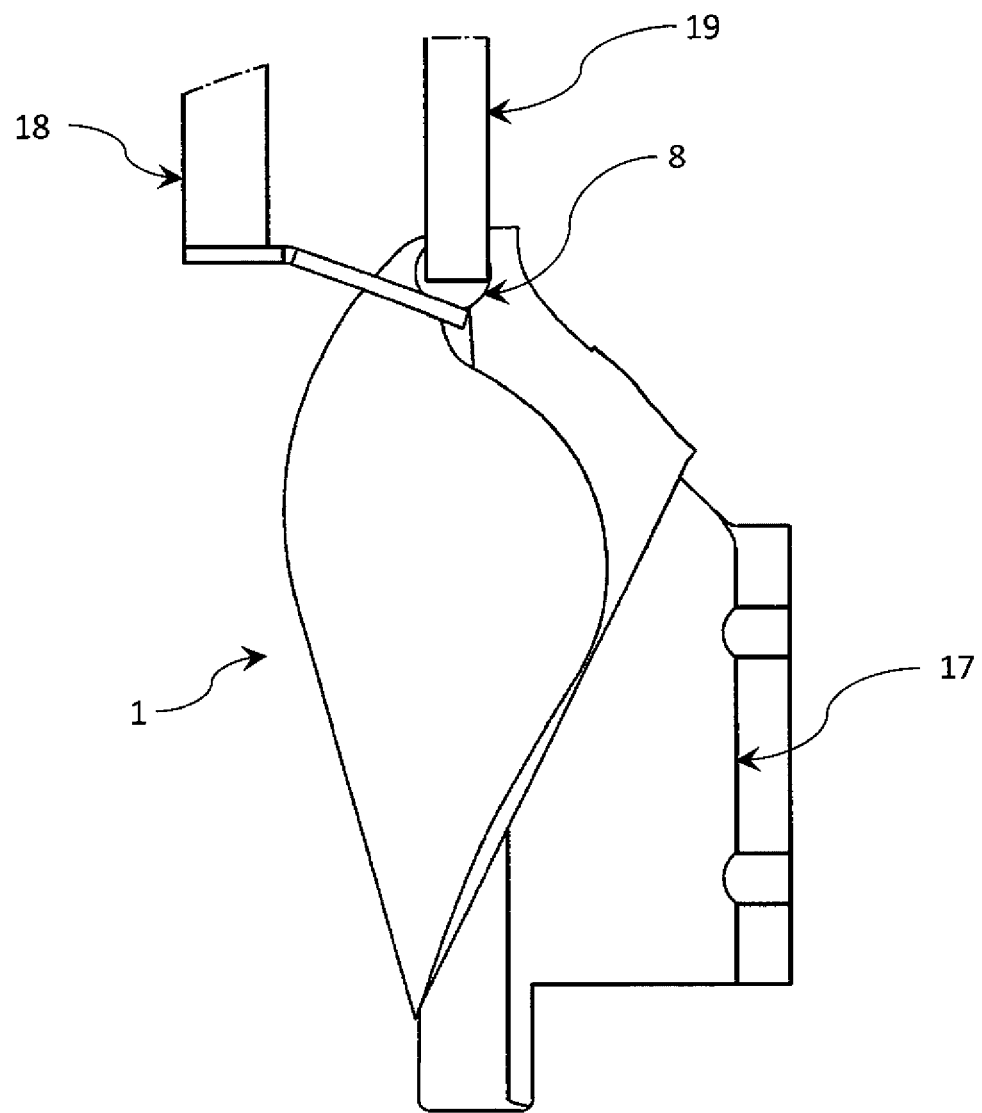
Figure 5:
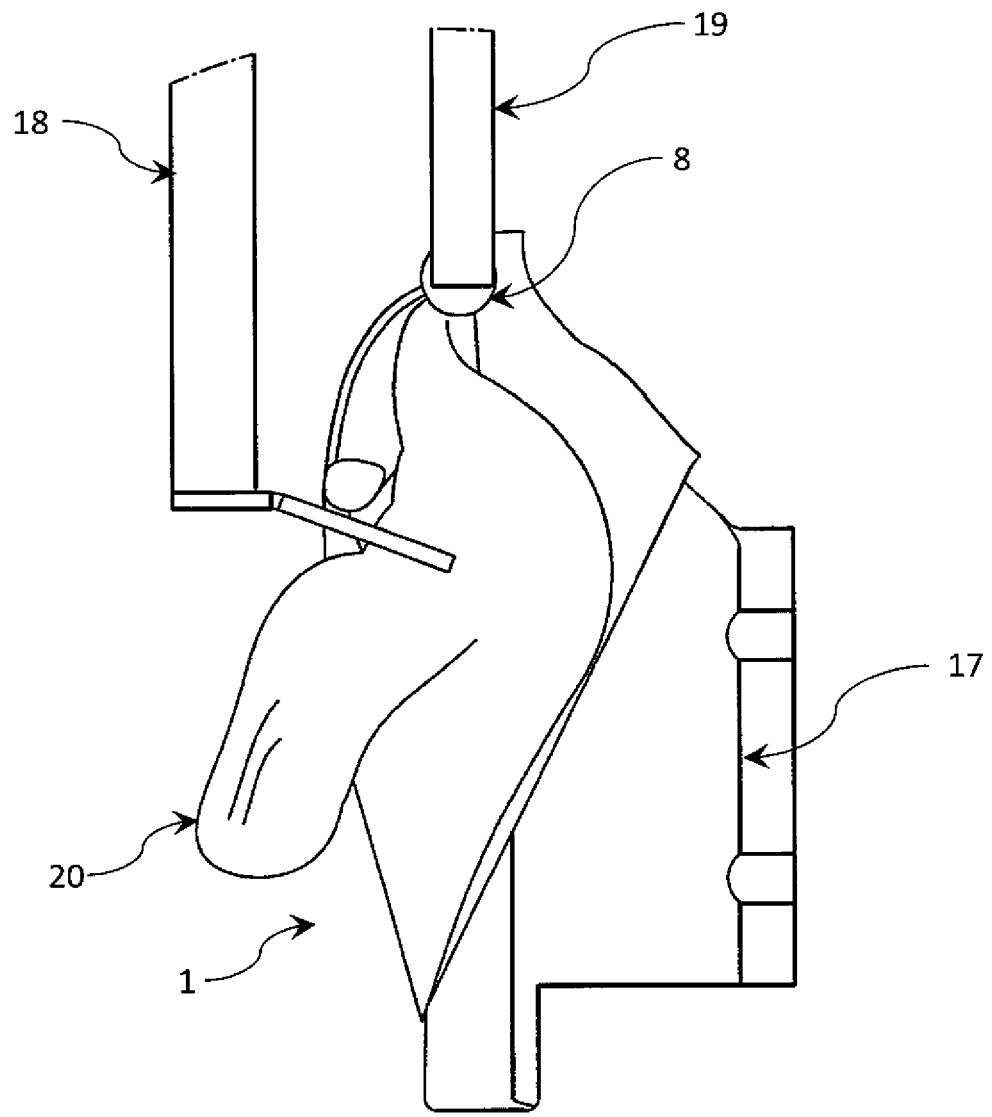

When the wing joints 8 are fixed in position by the fixation tool 19, the scraping tool 18 is tilted towards the carcass part 1 and moved down along the outer side of the legs of the wishbone 9 of the carcass part 1 as shown in FIGS. 4 and 5. In this process, the scraping tool 18 moves and pushes the outer fillets 20 away from the wishbone 9 so that the wishbone 9 gets exposed and is essentially free from any surrounding meat.

Figure 6:
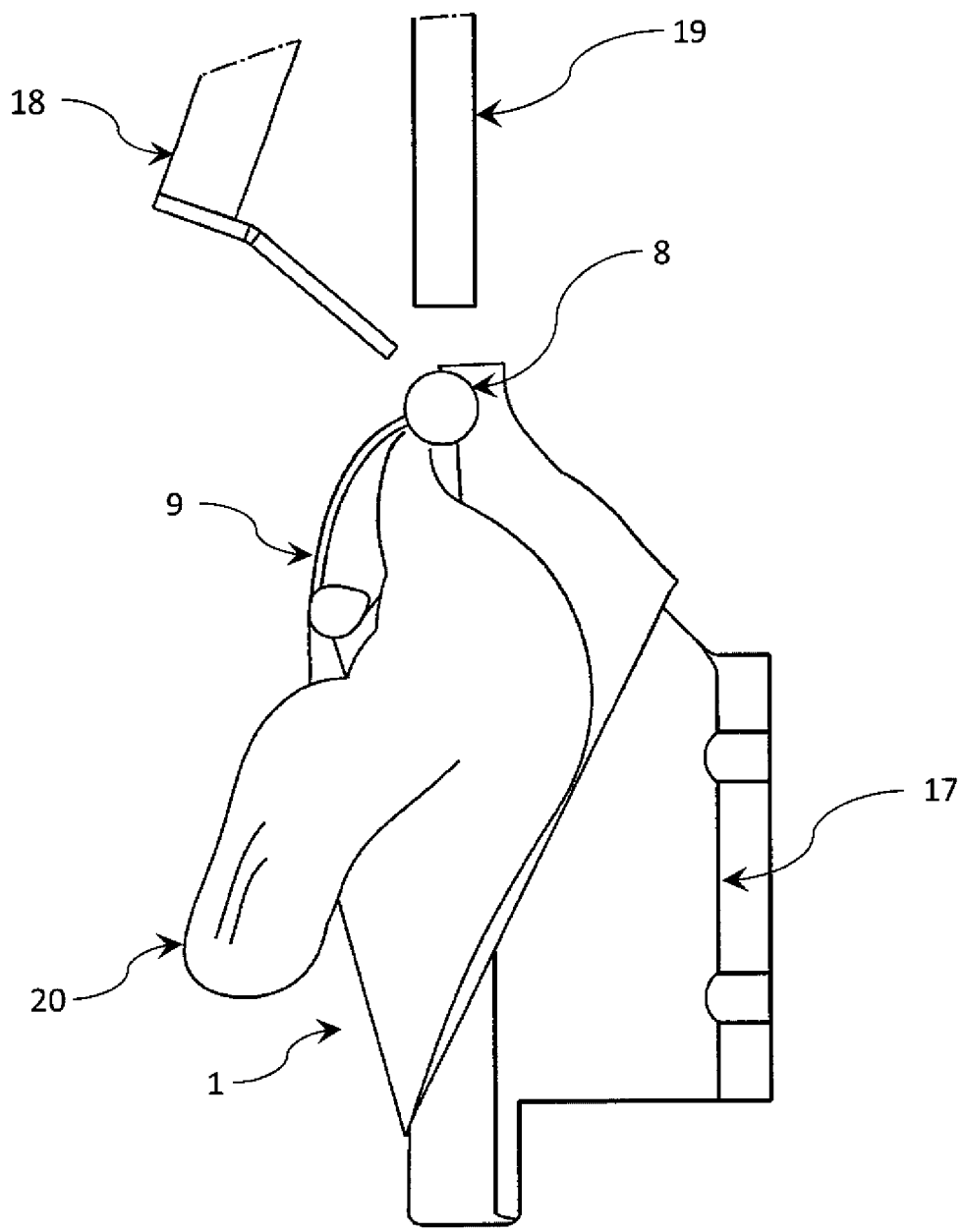

In FIG. 6 wherein the pushing away of the outer fillets 20 from the wishbone 9 is completed, it is shown that at the end of this pushing process the outer fillets 20 still are connected to the carcass part 1. The fixation tool 19 and the scraping tool 18 are then moved away from the carcass part 1 to give room for further operations on the carcass part 1, including the removal of the wishbone 9.

In one exemplary aspect, the essence of the invention as discussed hereinabove is directed to a prior processing of the carcass part and the meat present thereon, to make possible that the removal of the wishbone can be executed with the least amount of damage to the meat remaining on the carcass part and with the least amount of meat unintentionally removed from the carcass part during removal of the wishbone. Reference is made to FIGS. 8-12, wherein for clarity purposes the showing of meat is as much as possible avoided.

Figure 8:
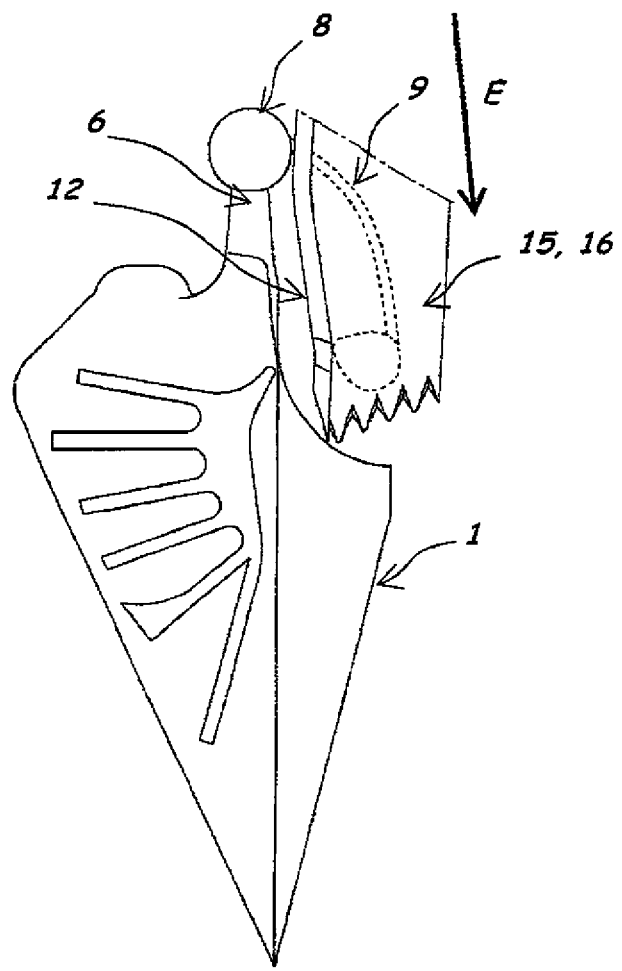
FIG. 8 shows in an exemplary process of removing the wishbone including a step of moving an arrow shaped knife with side blades into the carcass part.

FIG. 8 shows a first step of an exemplary process of removing the wishbone 9 integrally from the carcass part 1, by which first step an arrow shaped knife 12 and two blades 15, 16 arranged on opposite sides of the knife 12 are moved according to arrow E into the carcass part 1 for cutting a membrana (for the poultry professional: the membrana sternocoracoclavicularis) and/or ligament that connects the wishbone 9 to the keelbone 6.

Figure 9:
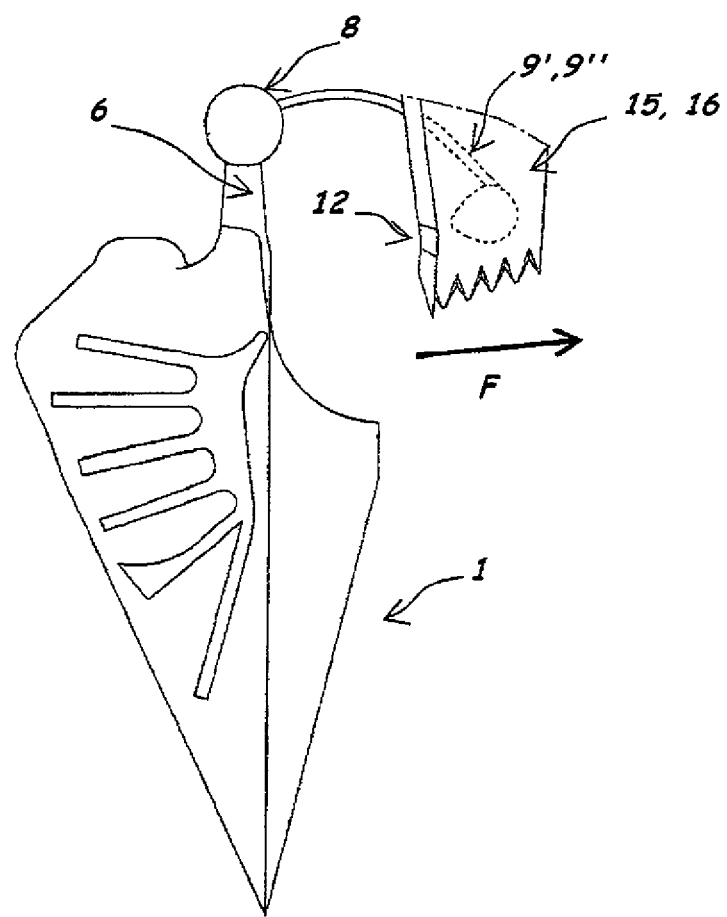
FIG. 9 shows in an exemplary process of removing the wishbone including a step of moving the arrow shaped knife with the side blades in unison away from the carcass part.

FIG. 9 shows an exemplary embodiment of this method in which the arrow shaped knife 12 and the two blades 15, 16 are moved away from a longitudinal axis of the carcass part to turn the wishbone legs 9', 9" with reference to the wing joints 8 to which they are still connected. Subsequently, by further turning the wishbone legs 9', 9" they are dislocated out of the wing joints 8 of the carcass-part 1. In this exemplary method, the arrow shaped knife 12 and the two blades 15, 16 on opposite sides of the knife 12 are moved first in a unitary movement from within the carcass-part 1 in a sideways direction according to arrow F away from (a longitudinal axis of) the carcass part 1. Following this movement, the arrow shaped knife 12 and the side blades 15, 16 can be moved upwards in unison according to arrows G (FIG. 10) and H (FIG. 11) in the process of which the wishbone legs 9', 9" are completely turned out of the wing joints 8 to enable their complete and integral detachment from the carcass part 1.

Figure 10:
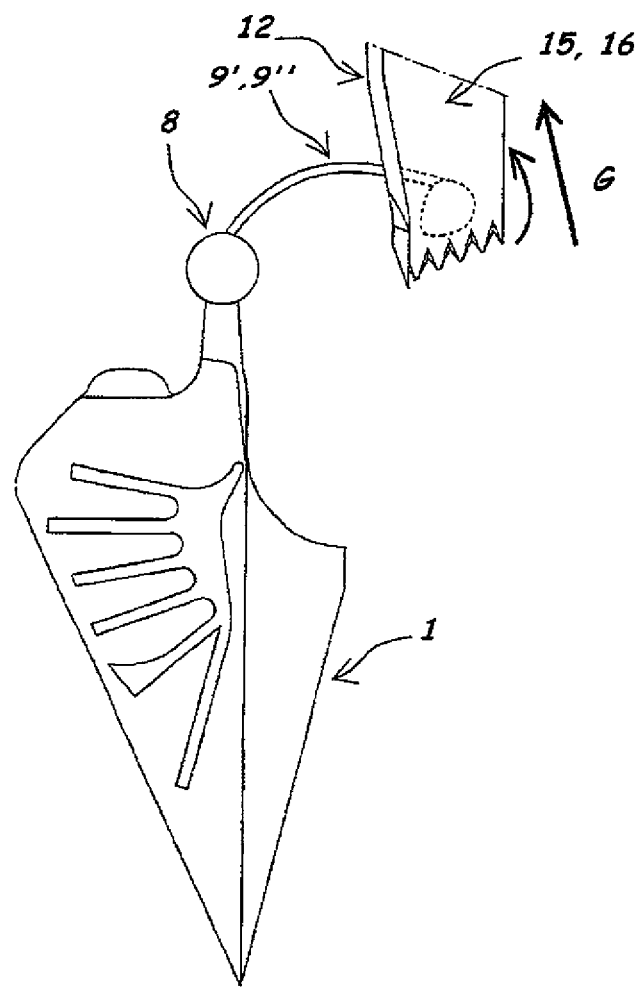
FIGS. 10 and 11 shows an exemplary process of removing the wishbone including a step of moving the arrow shaped knife with the side blades in unison upwards.
Figure 11:
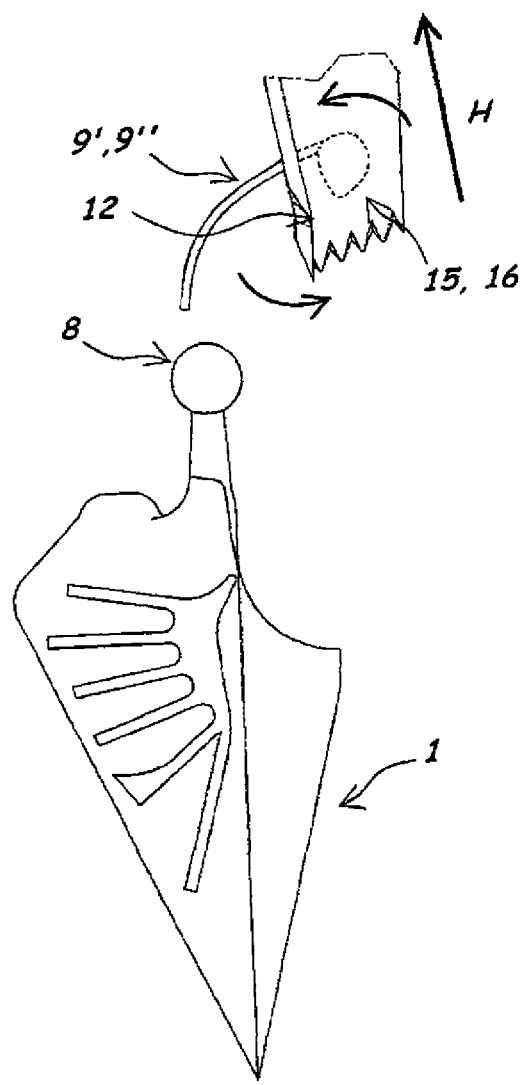
Figure 12:
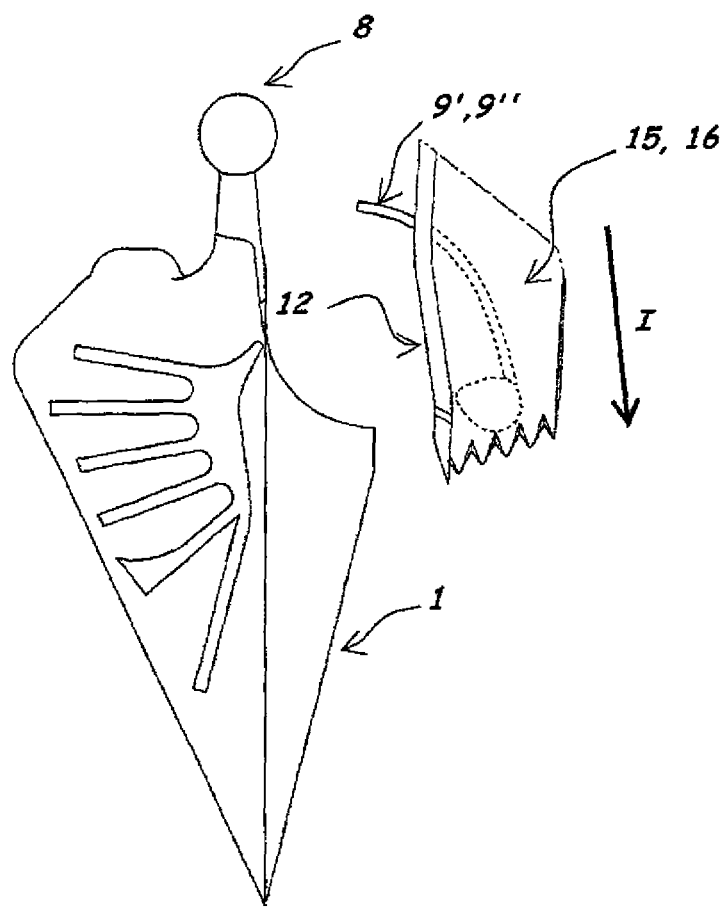
FIG. 12 shows in an exemplary process of removing the wishbone including a step of moving the arrow shaped knife with the side plates in unison downwards.

FIG. 12 concerns a variation to the exemplary method as explained with reference to FIGS. 9, 10 and 11, in which prior to the upward movement of the arrow shaped knife 12 and the two side blades 15, 16, but following their unitary movement away from the carcass part 1 as shown in FIG. 9, the knife 12 and blades 15, 16 are first moved downwardly in unison according to arrow I in order to effect the detachment of the wishbone legs 9', 9" from the wing joints 8.

Although the invention has been discussed in the foregoing with reference to an exemplary embodiment of the method and device of the invention, the invention is not re-stricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

What is claimed is:

1. A device for processing a carcass part of slaughtered poultry in a processing line, the carcass part including wing joints, coracoids, a wishbone being embodied with two legs that merge into each other at an acute angle, a keel bone, and naturally present meat including inner and outer fillets, the carcass part supported on a carrier movable in the processing line, the device comprising:
    means for cutting, removing, or both, the wishbone from the carcass part,
    means for moving the outer fillets away from the wishbone, wherein the means for moving the outer fillets away from the wish-bone are arranged to be operational prior to the the means for cutting, removing, or both of the wishbone from the carcass part.

2. The device according to claim 1, further comprising a cutter to partly release the connections of the outer fillets with the carcass part prior to the means for moving the outer fillets away from the wishbone are operational.

3. The device according to claim 1, wherein the means for moving the outer fillets away from the wishbone are arranged to push a part of the outer fillets adjacent to the wishbone towards another region of the carcass part without the meat of the outer fillets losing their connection with the remainder of the carcass part.

4. The device according to claim 1, wherein the means for moving the outer fillets away from the wishbone comprises a scraper.

5. The device according to claim 1, further comprising a fixation tool for the wing joints.

6. The device according to claim 5, wherein the fixation tool operates during use on the wing joints prior to and during a timeframe that the means for moving the outer fillets away from the wishbone are operational.

7. A method for processing a carcass part of slaughtered poultry in a processing line, the carcass part including wing joints, coracoids, a wishbone being embodied with two legs that merge into each other at an acute angle, a keel bone, and naturally present meat including inner and outer fillets, the method comprising
    providing the carcass part on a carrier and moving the carrier in the processing line;
    cutting, removing, or both, the wishbone from the carcass part; and
    moving the outer fillets away from the wishbone, the moving executed prior to the cutting, removing, or both of the wishbone from the carcass part.

8. The method according to claim 7, wherein prior to the moving the outer fillets away from the wishbone, an incision is provided in the connections of the outer fillets with the carcass part to partly release the outer fillets from the carcass part.

9. The method according to claim 7, wherein the moving the outer fillets away from the wishbone is executed by pushing a part of the outer fillets adjacent to the wishbone towards another region of the carcass part without the meat of the outer fillets losing their connection with the remainder of the carcass part.

10. The method according to claim 7, wherein the moving the outer fillets away from the wishbone is done by scraping.

11. The method according to claim 7, further comprising fixating the wing joints.

12. The method according to claim 11, wherein the fixating the wing joints is executed prior to and during the moving the outer fillets away from the wishbone.

* * * * *